(12) United States Patent
Shiraishi et al.

(10) Patent No.: US 11,048,610 B2
(45) Date of Patent: Jun. 29, 2021

(54) FLEET-WIDE MONITORING SYSTEM FOR VEHICLES

(71) Applicants: Toyota Motor Engineering & Manufacturing North America, Inc., Plano, TX (US); DENSO CORPORATION, Kariya (JP); Runtime Verification Inc., Urbana, IL (US)

(72) Inventors: Shinichi Shiraishi, Mountain View, CA (US); Grigore Rosu, Champaign, IL (US); Philip Daian, Great Neck, NY (US); Akihito Iwai, Kariya (JP); Yuki Mae, Kariya (JP)

(*) Notice: Subject to any disclaimer, the term of this patent is extended or adjusted under 35 U.S.C. 154(b) by 0 days.

(21) Appl. No.: 15/227,422

(22) Filed: Aug. 3, 2016

(65) Prior Publication Data

US 2018/0039558 A1 Feb. 8, 2018

(51) Int. Cl.
*G06F 8/65* (2018.01)
*G06F 11/36* (2006.01)
(Continued)

(52) U.S. Cl.
CPC .......... *G06F 11/3608* (2013.01); *G06F 8/65* (2013.01); *G06F 11/3612* (2013.01);
(Continued)

(58) Field of Classification Search
CPC .... G06F 11/3608; G06F 8/65; G06F 11/3612; G07C 5/006; G07C 5/0808; G07C 5/008; G07C 5/0816
See application file for complete search history.

(56) References Cited

U.S. PATENT DOCUMENTS

2005/0187668 A1* 8/2005 Baumgarte ............ G06F 8/60
701/1
2008/0154691 A1* 6/2008 Wellman ............ G05D 1/0282
705/7.26
(Continued)

OTHER PUBLICATIONS

Bessey; "A Few Billion Lines of Code Later: Using Static Analysis to Find Bugs in the Real World"; Commun. ACM; vol. 53, No. 2; pp. 66-75; 2010 (Year: 2010).*
(Continued)

*Primary Examiner* — Stephen Holwerda
(74) *Attorney, Agent, or Firm* — Burbage Law, P.C.; Jon-Michael Burbage; Elizabeth Ruzich

(57) ABSTRACT

A system, method and tangible memory provides a monitoring system for a fleet of vehicles. A monitoring server may receive a set of trace data associated with a vehicle application. The fleet of vehicles may include a plurality of vehicles that are communicatively coupled to the monitoring server via a wireless network. Each of the vehicles may include a copy of the vehicle application. The set of trace data may describe operations that are executed responsive to an onboard computer executing the copy of the vehicle application. The set of trace data and model data may be input into an RV-Predict application. The model data may describe a formal model of the vehicle application. A prediction application may be executed with a processor to generate predictive data describing a predictive analysis of whether the vehicle application includes an error.

20 Claims, 5 Drawing Sheets

(51) Int. Cl.
*G07C 5/00* (2006.01)
*G07C 5/08* (2006.01)
(52) U.S. Cl.
CPC .......... *G07C 5/006* (2013.01); *G07C 5/008* (2013.01); *G07C 5/0808* (2013.01); *G07C 5/0816* (2013.01); *G07C 5/0825* (2013.01)

(56) References Cited

U.S. PATENT DOCUMENTS

| | | | | |
|---|---|---|---|---|
| 2011/0307336 A1* | 12/2011 | Smirnov | ................... | G06F 8/64 |
| | | | | 705/14.62 |
| 2013/0031540 A1* | 1/2013 | Throop | ................... | G06F 8/654 |
| | | | | 717/173 |
| 2013/0117739 A1* | 5/2013 | Mueller | ................... | G06F 8/60 |
| | | | | 717/169 |

OTHER PUBLICATIONS

Pradel; "Leveraging Test Generation and Specification Mining for Automated Bug Detection without False Positives"; ICSE'12: Proceedings of the 34th International Conference on Software Engineering; Zurich, Switzerland; pp. 288-298; 2012 (Year: 2012).*

* cited by examiner

FLEET-WIDE MONITORING SYSTEM FOR VEHICLES

CROSS REFERENCE

This application is related to U.S. patent application Ser. No. 14/939,625 filed on Nov. 12, 2015 and entitled "Application Assurance for Open Platform In-Vehicle Infotainment System," the entirety of which is hereby incorporated by reference.

BACKGROUND

The specification relates to a fleet-wide monitoring system for vehicles. In particular, the specification may relate to a fleet-wide monitoring system proactively determining software patches for vehicle applications.

Modern vehicles include software running onboard. Unfortunately, it is hard to identify all the bugs and vulnerability problems in the vehicle software before the vehicles are first sold to the public. Once a software problem is found in the field, the cost of fixing the problem is expensive. One of the reasons for this expense is that a large portion of software is commonly used among many different types of vehicles from the same original equipment manufacturer ("OEM") and, so, the recall should be fleet-wide. The current approach to this problem is reactive in nature, i.e., if a problem is found in the vehicle software, the vehicle manufacturer will prepare a software update and an update plan. However, this process is time consuming and expensive.

SUMMARY

A vehicle application includes a monitor module. The monitor module may monitor the execution of the vehicle application. For example, the vehicle may include an onboard computer. The onboard computer may include a processor. The processor may execute the vehicle application.

The monitor module may generate a trace log describing the execution of the vehicle application. For example, the onboard computer of the vehicle may execute the vehicle application and the monitor module may monitor the execution of the vehicle application and build the trace log describing the execution of the vehicle application. The trace log may describe an execution trace describing the execution of the vehicle application.

The monitor module may transmit the trace log to a monitor server. For example, the monitor module may transmit trace data describing the trace log to the monitor server via a wireless network that is communicatively coupled to the monitor server and the vehicle.

The monitor server may include a prediction system. The prediction system may include an RV-Predict application (or any software derived therefrom) produced and distributed by Runtime Verification Inc. of Urbana, Ill. The prediction system may also include formal model data describing a formal model for the vehicle application. The formal model may define the desired behavior of the vehicle application upon being executed by the onboard computer of the vehicle 123. The trace log and the formal model data may be inputs for the RV-Predict application.

A processor of the monitor server may execute the RV-Predict application to generate predictive data. The predictive data may describe one or more errors that are predicted to occur for the vehicle application. An error may include behavior of the vehicle application that is inconsistent with the desired behavior of the vehicle application as defined by the formal model for the vehicle application. In some implementations, the error may include a race condition or a software bug present in the vehicle application. In some implementations, the error may include a Java concurrency error.

The monitor server may include a patch module and the object code for the vehicle application. The predictive data and the object code may be an input to the patch module. The processor of the monitor server may execute the patch module to generate patch data. The patch data may describe a patch for the vehicle application that is configured (or operable) to modify the vehicle application so that one or more problems described by the predictive data do not occur.

The patch data may be distributed to one or more vehicle that include the vehicle application. For example, the patch data may be distributed fleet-wide. For vehicles in the fleet that are enabled to receive wireless updates, the patch data may be distributed wirelessly via the network. For vehicles in the fleet that are not enabled to receive wireless updates, the patch may be distributed via onsite visits to dealerships and other vehicle service centers.

In this way the prediction system of the monitor server may proactively identity and correct errors present in vehicle applications without requiring a vehicle recall. The prediction system also beneficially enables vehicles to be sold to the public without requiring human design engineers to identify and correct every error or potential problem that may be present in a particular vehicle application prior to selling the vehicles to the public.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving a set of trace data from a plurality of vehicles included in a fleet of vehicles, where the plurality of vehicles includes a copy of a vehicle application and the set of trace data describes one or more operations that are executed responsive to an onboard vehicle computer executing the copy of the vehicle application; inputting the set of trace data and model data into an RV-Predict application, where the model data describes a formal model of the vehicle application; and executing the RV-Predict application with a processor to generate predictive data describing a predictive analysis of whether the vehicle application includes an error, where the predictive analysis is configured to never include a false positive. Other embodiments of this aspect include corresponding computer systems, apparatus, and computer programs recorded on one or more computer storage devices, each configured to perform the actions of the methods.

Implementations may include one or more of the following features. The method where each vehicle included in the fleet of vehicles includes a copy of the vehicle application. The method where the predictive analysis is proactive and occurs before the error is identifiable by the operation of the fleet of vehicles. The method where the copy of the vehicle application includes a monitor module that includes software that is operable to collect trace data describing the one or more operations responsive to the copy of the vehicle application and the monitor module being executed by the onboard vehicle computer. The method where the vehicle application is selected from a set that includes one or more of the following: a vehicle navigation application including a monitor module operable to collect the trace data responsive to being executed by the onboard computer; an advanced driver assistance system application including the monitor module; an infotainment system application including the monitor module; a diagnostic application including the monitor module; and an Automotive Open System Architecture (AUTOSAR) application including the monitor module. The method where the fleet of vehicles shares a common manufacturer. The method where the fleet of vehicles shares a common model. The method where the fleet of vehicles shares a common OEM. The method where the formal model describes a set of desired behaviors of the vehicle application and the RV-Predict application, responsive to being executed by the processor, compares the set of trace data to the set of desired behaviors of the vehicle application to provide the predictive analysis described by the predictive data. The method where the method is executed by a computing device that is wirelessly coupled to the plurality of the vehicles included in the fleet of vehicles via a wireless network. The method further including: determining, based on the predictive data, that the vehicle application includes the error; generating a patch that is operable to be installed in the copy of the vehicle application to correct the error; and distributing the patch to one or more of the vehicles included in the fleet of vehicles. The method where distributing the patch includes wirelessly transmitting patch data describing the patch to the plurality of vehicles included in the fleet of vehicles via the wireless network. The method further including the plurality of vehicles receiving the patch data via the wireless network and updating the copy of the vehicle application based on the patch data. The method further including the plurality of vehicles restarting the copy of the vehicle application after updating the copy of the vehicle application based on the patch data. The method where distributing the patch includes installing the patch in one or more of the vehicles included in the fleet of vehicles at a service station. Implementations of the described techniques may include hardware, a method or process, or computer software on a computer-accessible medium.

One general aspect includes a non-transitory memory of a computer system, the non-transitory memory including computer code which, when executed by a processor, causes the processor to perform steps including: receiving a set of trace data associated with a vehicle application from a plurality of vehicles included in a fleet of vehicles, where the plurality of vehicles each include a copy of the vehicle application and the set of trace data describes one or more operations that are executed responsive to an onboard vehicle computer executing the copy of the vehicle application; inputting the set of trace data and model data to an RV-Predict application, where the model data describes a formal model of the vehicle application; and executing the RV-Predict application with a processor to generate predictive data describing a predictive analysis of whether the vehicle application includes an error, where the predictive analysis is configured to never include a false positive. Other embodiments of this aspect include corresponding computer systems, apparatus, and computer programs recorded on one or more computer storage devices, each configured to perform the actions of the methods.

Implementations may include one or more of the following features. The non-transitory memory of the computer system where the non-transitory memory includes further computer code which, when executed by the processor, causes the processor to perform steps including: determining, based on the predictive data, that the vehicle application includes the error; generating a patch that is operable to be installed in the copy of the vehicle application to correct the error; and distributing the patch to the plurality of vehicles included in the fleet of vehicles. Implementations of the described techniques may include hardware, a method or process, or computer software on a computer-accessible medium.

One general aspect includes a system including: a processor; and a non-transitory memory storing an RV-Predict application, a set of trace data associated with a vehicle application and model data describing a formal model for the vehicle application; where the set of trace data is received from a fleet of vehicles that include a copy of the vehicle application and the set of trace data describes one or more operations that are executed responsive to an onboard computer executing the copy of the vehicle application; where the set of trace data and the model data are inputted to the RV-Predict application; and where the RV-Predict application, responsive to being executed by the processor, generates predictive data describing a predictive analysis of whether the vehicle application includes an error. Other embodiments of this aspect include corresponding computer systems, apparatus, and computer programs recorded on one or more computer storage devices, each configured to perform the actions of the methods.

Implementations may include one or more of the following features. The system where the predictive analysis is proactive and occurs before the error is identifiable by the operation of the fleet of vehicles. The system where one or more batches of trace data are periodically received on a continuing basis and the predictive analysis is periodically repeated using the one or more batches of trace data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
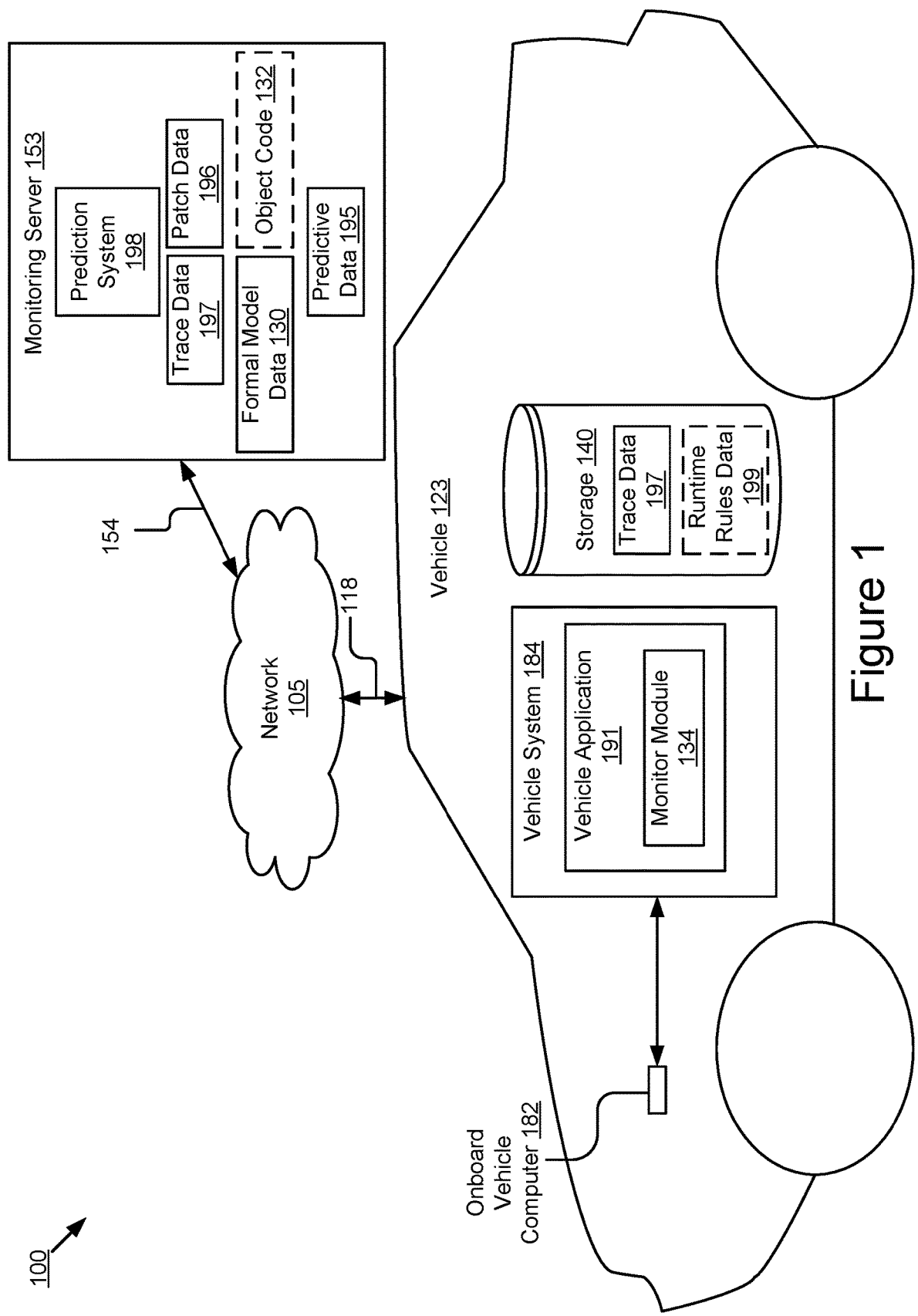
FIG. 1 is a block diagram illustrating an example operating environment for a prediction system to monitor a fleet of vehicles.

FIG. 1 illustrates a block diagram of one embodiment of an operating environment 100 for a prediction system 198 to monitor a fleet of vehicles 123. The operating environment 100 includes the vehicle 123 and a monitoring server 153. In the illustrated embodiment, these entities of the environment 100 may be communicatively coupled via a network 105.

The vehicle 123 and the monitoring server 153 may be used by way of example. While FIG. 1 illustrates one vehicle 123 and one monitoring server 153, the disclosure applies to a system architecture having one or more vehicles 123 and one or more monitoring servers 153. Furthermore, although FIG. 1 illustrates one network 105 coupled to the vehicle 123 and the monitoring server 153, in practice one or more networks 105 can be connected to these entities. In some embodiments, FIG. 1 may include one or more monitor modules 134 and one or more prediction systems 198.

A fleet of vehicles may include a plurality of vehicles 123. The fleet of vehicles may be associated with one another by a common feature. For example, each of the vehicles 123 included in the fleet of vehicles may have a common make, a common model or a common OEM. For example, each vehicle 123 included in the fleet may be manufactured by Toyota Motor Corporation. In another example, each vehicle 123 included in the fleet may be a Toyota Camry. In yet another example, each vehicle 123 included in the fleet may include a component (e.g., vehicle system 184) manufactured by the same OEM. In some implementations, each vehicle 123 included in the fleet may include the vehicle application 191, and this may be the common feature shared among the vehicles 123 included in the fleet of vehicles.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data via short messaging service (SMS), multimedia messaging service (MMS), hypertext transfer protocol (HTTP), direct data connection, WAP, e-mail, etc. In some implementations, the network 105 may include a GPS satellite for providing GPS navigation to the vehicle 123. The network 105 may be a mobile data network such as 3G, 4G, LTE, Voice-over-LTE ("VoLTE"), or any other mobile data network or combination of mobile data networks.

The monitoring server 153 can be a hardware server that includes a processor, a memory and network communication capabilities. In the illustrated example, the monitoring server 153 is coupled to the network 105 via signal line 154.

The monitoring server 153 may include a prediction system 198. In some implementations, some elements of the prediction system 198 may reside on the monitoring server 153 and some elements of the prediction system 198 may reside on the vehicle 123. In some implementations, a first prediction system 198 may reside on the monitoring server 153 while a second prediction system 198 may reside on the vehicle 123. In some implementations, the monitoring server 153 includes a first prediction system 198, the vehicle 123 includes a second prediction system 198 and some of the functionality of the prediction system 198 is provided by the monitoring server 153 while some of the functionality of the prediction system 198 is provided by the vehicle 123.

In some embodiments, the monitoring server 153 may include one or more of the following elements in addition to the prediction system 198: trace data 197; patch data 196; formal model data 130; object code 132; and predictive data 195. The elements may be stored on a tangible memory of the monitoring server 153. The tangible memory may be configured to be accessible by a processor of the monitoring server 153.

The monitoring server may receive the trace data 197 from the vehicle 123 via the network 105. The trace data 197 may describe one or more operations that are executed responsive to the vehicle application 191 being executed by a processor of the vehicle 123.

In some implementations, the trace data 197 may describe the behavior of the vehicle application 191 responsive to being executed. For example, the trace data 197 may describe one or more operations that are called by the vehicle application 191, data that is accessed by the vehicle application 191, errors that occur during the execution of the vehicle application 191, one or more measurable parameters of the vehicle application 191 upon being executed, etc.

In some implementations, the trace data 197 may include a trace log. The trace log may include one or more of the following: one or more operations executed by the vehicle application 191; the data accessed by the vehicle application 191; one or more error messages associated with the operation of the vehicle application 191; one or more measurable parameters of the vehicle application 191 upon being executed (e.g., data describing how long the vehicle application 191 has currently operated, i.e., service life); and any other data associated with the operation of the vehicle application 191 by a processor of the vehicle 123. The trace log may describe an execution trace describing an execution of the vehicle application 191. An example of the trace log according to some implementations is described in U.S. patent application Ser. No. 14/939,625 which is incorporated herein by reference.

In some implementations, the trace data 197 may include a set of trace data 197 that is received from one or more vehicles 123. For example, the set of trace data 197 may include the trace data 197 that is received from a fleet of vehicles 123.

The prediction system 198 may include software that is operable to analyze the trace data 197 and determine whether an error is present in the vehicle application 191. An error may include one or more software bugs or vulnerabilities present in the vehicle application 191. The prediction system 198 may be operable to analyze the trace data 197 received from one or more vehicles 123 and determine whether an error is present in the vehicle application 191.

The prediction system 198 may be operable to proactively analyze the trace data 197 and determine whether an error is present in the vehicle application 191 before the error is identifiable by the operation of the fleet of vehicles. For example, the prediction system 198 may identify the error prior the error being discovered in the field. For example, the error may require a certain combination of conditions to be present before the error will occur. The prediction system 198 may be operable to analyze the trace data 197 to provide a predictive analysis of errors that will occur in the future if the vehicle application 191 continues to operate among the fleet of vehicles without being modified to correct the code and routines of the vehicle application 191 in a way that is configured to prevent the error from occurring.

The patch data 196 may include code and routines operable to be installed in the vehicle application 191 to correct the error identified by the prediction system 198 analyzing the trace data 197. The patch data 196 may describe a software patch for the vehicle application 191 that is configured to modify the code and routines of the vehicle application 191 in a way that is operable to prevent an error from occurring.

The formal model data 130 may include data describing a formal model for the vehicle application 191. The formal model data 130 may include a specification for the vehicle application 191.

The object code 132 may include the object code for the vehicle application 191. In some implementations, the object code 132 may be included in the formal model data 130.

The object code 132 is depicted with a dashed line in FIG. 1 because it is an optional feature of the operating environment 100 according to some implementations. For example, in some implementations patch data 196 may be generated without receiving the object code 132 as an input.

The predictive data 195 may include data describing the error present in the vehicle application 191. The predictive data 195 may describe the error identified by the prediction system 198 analyzing the trace data 197. The predictive data 195 may describe a predictive analysis generated by the prediction system 198. The predictive analysis may include a prediction that the error will occur for the vehicle application 191 at a point in the future.

In some implementations, the error described by the predictive data 195 may include a race condition present in the vehicle application 191 or potentially present in the vehicle application 191 upon execution. In some implementations, the error may include a Java concurrency error present in the vehicle application 191.

In some implementations, the error described by the predictive data 195 may include a software bug present in the vehicle application 191.

In some implementations, the prediction system 198 can be implemented using hardware including a field-programmable gate array ("FPGA") or an application-specific integrated circuit ("ASIC"). In some other implementations, the prediction system 198 can be implemented using a combination of hardware and software. The prediction system 198 may be stored in a combination of the devices and servers, or in one of the devices or servers. The prediction system 198 may include code and routines configured to perform one or more steps of the method 400 described below with reference to FIG. 4 when executed by a processor, such as processor 325, described below with reference to FIG. 3.

The prediction system 198 is described in more detail below with reference to FIGS. 3, 4, and 5.

The monitoring server 153 may send and receive data to and from other entities of the environment 100 via the network 105. For example, the monitoring server 153 may receive the trace data 197 from the vehicle 123 via the network 105. The monitoring server 153 may transmit the patch data 196 to the vehicle 123 via the network 105.

The vehicle 123 may include an automobile, a bus, an airplane, a boat, or other vehicular conveyance. The vehicle 123 may be an electric, hybrid or include an internal combustion engine. In some implementations, the vehicle 123 may include an autonomous vehicle or a semi-autonomous vehicle 123. In some implementations, the vehicle 123 may include a semi-autonomous vehicle 123 in which the vehicle 123 controls at least part of the steering functionality of the vehicle 123. In the illustrated example, the vehicle 123 is communicatively coupled to the network 105 via signal line 118.

The vehicle 123 may include one or more of the following elements: an onboard vehicle computer 182; a vehicle system 184; a vehicle application 191; a monitor module 134; and a storage 140.

The onboard vehicle computer 182 may include one or more of the following: a memory; a processor; and network communication capabilities. The onboard vehicle computer 182 may include a special-purpose computing device. The onboard vehicle computer 182 may be communicatively coupled to a vehicle system 184. The onboard vehicle computer 182 may control performance of one or more of the following elements: the vehicle system 184, the vehicle application 191; and the monitor module 134.

The vehicle system 184 may include any system of the vehicle 123 that includes a vehicle application 191. For example, the vehicle system 184 may include one or more of the following: a vehicle navigation system; an advanced driver assistance system (ADAS); an infotainment system; a diagnostic system; a system of the vehicle 123 that includes an Automotive Open System Architecture (AUTOSAR) application.

In some implementations, the vehicle system 184 may include any element of a vehicle 123 that is operable based in part on software.

Figure 2:
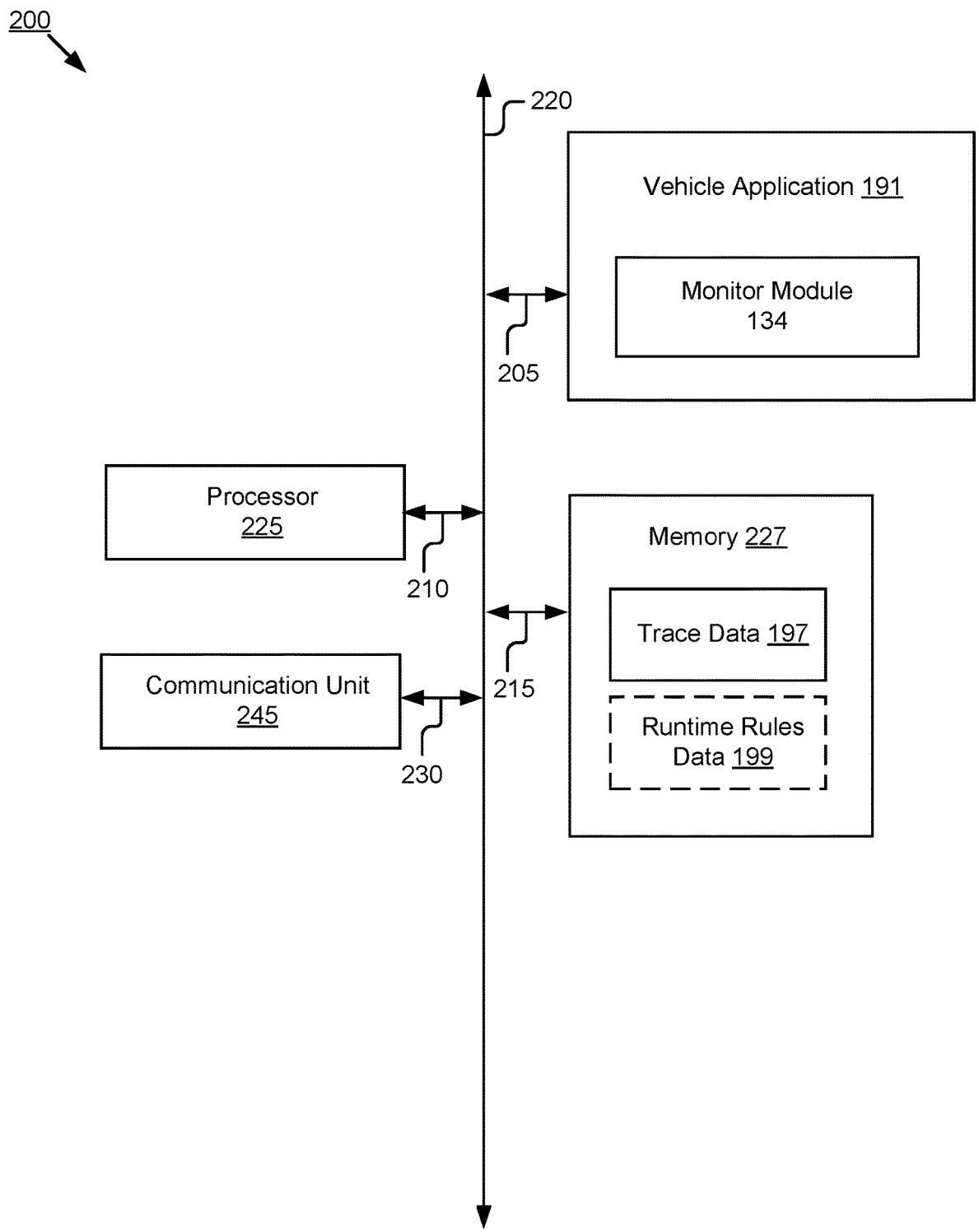
FIG. 2 is a block diagram illustrating an example vehicle system for providing trace data describing operation of a vehicle application that is being monitored.

The vehicle system 184 may include one or more of the following: a memory; a processor; and network communication capabilities. An example of the vehicle system 184 is depicted in FIG. 2.

The vehicle application 191 may include any vehicle software that includes the monitor module 134. For example, the vehicle application may include one or more of the following: vehicle navigation application including a monitor module 134; an advanced driver assistance system application including the monitor module 134; an infotainment system application including the monitor module 134; a diagnostic application including the monitor module 134; and an Automotive Open System Architecture (AUTOSAR) application including the monitor module 134.

The vehicle application 191 may include any software, data and information necessary for the vehicle system 184 to provide its functionality.

The vehicle application 191 may include a monitor module 134. The monitor module 134 may include code and routines that, when executed by a processor of the vehicle system 184 or the onboard vehicle computer 182, cause the processor to monitor the operation of the vehicle application 191 and generate the trace data 197.

Implementations of the monitor module 134 may be described in U.S. patent application Ser. No. 14/939,625, which is incorporated herein by reference.

The monitor module 134 may be instrumented in the vehicle application 191.

The monitor module 134 may store the trace data 197 in the storage 140. The trace data 197 may be stored in the storage 140 and transmitted to the monitoring server 153 via the network 105. The monitor module 134 may include code and routines configured to transmit the trace data 197 to the monitoring server 153. For example, the monitor module 134 may continuously, regularly or periodically transmit the trace data 197 to the monitoring server 153.

In some implementations, the monitor module 134 may delete the trace data 197 stored on the storage 140 after transmitting the trace data 197 to the monitoring server 153. This deletion functionality may be automatic. This deletion functionality may beneficially free up space in the storage 140 and prevent duplicative trace data 197 from being present at the monitoring server 153. This deletion functionality also beneficially reduces the amount of data transmitted via the network 105 so that the transmission is quicker and more efficient.

In some implementations the monitor module 134 may selectively transmit only the trace data 197 that has not been transmitted to the monitoring server 153 before. This selective transmission beneficially reduces the amount of data transmitted via the network 105 so that the transmission is quicker and more efficient.

In some implementations, the monitor module 134 (or some other software present in the vehicle system 184 or the vehicle application 191) may include code and routines configured to receive the patch data 196 from the monitoring server 153. The patch data 196 may be stored at least temporarily in the storage 140 or some other non-transitory memory of the vehicle 123.

In some implementations, the monitor module 134 (or some other software present in the vehicle system 184 or the vehicle application 191) may install the patch described by the patch data 196 so that the vehicle application 191 is modified.

In some implementations, the monitor module 134 (or some other software present in the vehicle system 184 or the vehicle application 191) may cause the vehicle system 184 or the vehicle application 191 to restart and complete the installation of the patch.

The storage 140 may include a tangible storage medium that stores instructions or data that may be accessed and executed by a processor of the vehicle 123. The instructions or data may include code for performing the techniques described herein. The storage 140 may include a dynamic random access memory (DRAM) device, a static random access memory (SRAM) device, flash memory, or some other memory device. In some implementations, the storage 140 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the vehicle 123 may include an RV-Monitor application (not pictured), or any software derived therefrom. The RV-Monitor application may include the product produced and distributed by Runtime Verification Inc. of Urbana, Ill. The RV-Monitor application may include code and routines configured to generate and configure the monitor module 134 so that the monitor module 134 measures the measurable parameters resulting from execution of the vehicle application 191. The measured parameters observed by the monitor module 134 may be described by the trace data 197. In this way, the monitor module 134 may observe the behavior of the vehicle application 191.

In some implementations, the RV-Monitor application may include code and routines configured to instrument the vehicle application 191 to include the monitor module 134. Optionally, the vehicle 123 may include a JavaMOP application which, responsive to being executed by a processor, instruments the vehicle application 191 so that the vehicle application 191 includes the monitor module 134.

Optionally, the storage 140 may also store runtime rules data 199. The runtime rules data 199 are depicted with a dashed line in FIG. 1 to indicate that they are an optional feature of the operating environment 100. The runtime rules data 199 may describe one or more runtime rules. The one or more runtime rules may describe the desired behavior of the vehicle application 191 after being executed by a processor of the vehicle 123. For example, the one or more runtime rules may describe one or more desired parameters for the vehicle application 191. The RV-Monitor application may include code and routines to determine and configure the one or more runtime rules so that compliance with the one or more runtime rules corresponds to compliance with a specification of an application programming interface (API) for the vehicle system 184.

In some implementations, the RV-Monitor application may generate the monitor module 134 and the runtime rules data 199 as described in U.S. patent application Ser. No. 14/939,625. In some implementations, the storage 140 may store the API for the vehicle system 184 or the specification for the API. The RV-Monitor application may access this data on the storage and use this data to generate the monitor module 134 or the runtime rules data 199 as described in U.S. patent application Ser. No. 14/939,625.

Upon execution of the vehicle application 191, the monitor module 134 may observe the behavior of the vehicle application and compare the observed behavior to the desired behavior described by the runtime rules data 199. For example, the monitor module 134 may trace the observed parameters of the vehicle application 191 upon execution. The monitor module 134 may collect trace data 197 describing whether the observed behavior of the vehicle application is consistent with the desired behavior of the vehicle application 191. The monitor module 134 may build a trace log. For example, the trace data 197 may include a trace log describing one or more parameters of the vehicle application 191 which were measured by the monitor module 134 upon execution of the vehicle application 191. The monitor module 134 may identify instances where the observed behavior of the vehicle application 191 is inconsistent with the desired behavior of the vehicle application 191.

As described above, the runtime rules data 199 are depicted in FIG. 1 with a dashed line to indicate that they are an optional feature of the vehicle 123. For example, the trace data 197 may describe the behavior of the vehicle application 191 upon execution by the processor 225 without also describing whether this behavior is consistent with the runtime rules data 199. Implementations that include the runtime rules data 199 may include trace data 197 that describes whether the behavior of the executed vehicle application 191 is consistent with the one or more runtime rules described by the runtime rules data 199.

In some implementations, the runtime rules data 199 may be present on the monitoring server 153 and the prediction system may analyze the trace data 197 to determine whether the behavior of the vehicle application 191 is consistent with the runtime rules; this analysis may be a component of the predictive analysis provided by the prediction system 198 or a separate benefit provided by the prediction system. For example, the monitoring server 153 may include a RV-Monitor application and a copy of the specification for the API of the vehicle system 184 and the RV-Monitor application may generate the runtime rules data 199 that is used by the prediction system 198 in some implementations.

In some implementations, the vehicle system 184 may communicate the trace data 197 describing the execution of the vehicle application 191 to the monitoring server 153. The prediction system 198 of the monitoring server 153 may analyze the trace data 197 describing the behavior of the vehicle application 191 and determine how to modify the code of the vehicle application 191 so that the behavior of the vehicle application 191 upon execution is not undesirable. These modifications may be described by the patch data 196. The monitoring server 153 may transmit patch data 196 to the vehicle system 184 describing how to modify the code of the vehicle application 191 so that it may be executed without resulting in undesirable behavior. In some implementations, the monitoring server 153 may transmit the patch data 196 to other vehicles 123 included in the fleet of vehicles. In this way, the monitoring server 153 may assist in correcting the behavior of a vehicle application 191 included in a single vehicle 123 or a fleet including two or more vehicles 123.

Example Electronic Devices

FIG. 2 is a block diagram illustrating an example system 200 for providing trace data 197 describing the operation of the vehicle application 191 that is being monitored by the monitor module 134 to generate the trace data 197 and the prediction system 198 which analyzes the trace data 197.

The system 200 may be an element of the vehicle 123. In some implementations, the system 200 may include a special-purpose computing device configured to provide some or all of the functionality described herein. The system 200 may include one or more of the vehicle system 184 or the onboard vehicle computer 182.

The system 200 may include the vehicle application 191, a processor 225, a memory 227 and a communication unit 245. The components of the system 200 are communicatively coupled by a bus 220. In some embodiments, the components of the system 200 are local to the same hardware so that the bus 220 is not necessary for communication among the components of the system 200. In some embodiments, communication structures or methods other than the bus 220 may be implemented.

The vehicle application 191 is communicatively coupled to the bus 220 via a signal line 205. The processor 225 is communicatively coupled to the bus 220 via signal line 210. The memory 227 is communicatively coupled to the bus 220 via the signal line 215. The communication unit 245 is communicatively coupled to the bus 220 via signal line 230. In some embodiments, one or more of the elements of the system 200 may share a signal line for communication with the bus 220.

The vehicle application 191 may include a monitor module 134. The vehicle application 191 and the monitor module 134 were described above with reference to FIG. 1, and so, these descriptions will not be repeated here.

The memory 227 is a tangible storage medium that stores instructions or data that may be accessed and executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The memory 227 may include one or more of the following elements: the trace data 197; and the runtime rules data 199.

The runtime rules data 199 is depicted in FIG. 2 to indicate it is an optional feature of the system 200. For example, the trace data 197 may describe the behavior of the vehicle application 191 upon execution by the processor 225 without also describing whether this behavior is consistent with the runtime rules data 199. Implementations that include the runtime rules data 199 may include trace data 197 that describes whether the behavior of the executed vehicle application 191 is consistent with the one or more runtime rules described by the runtime rules data 199.

The trace data 197 and the runtime rules data 199 were described above with reference to FIG. 1, and so, those descriptions will not be repeated here.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. The processor 225 may include a graphical processing unit. Other processors, operating systems, sensors, displays, and physical configurations may be possible.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

Figure 3:
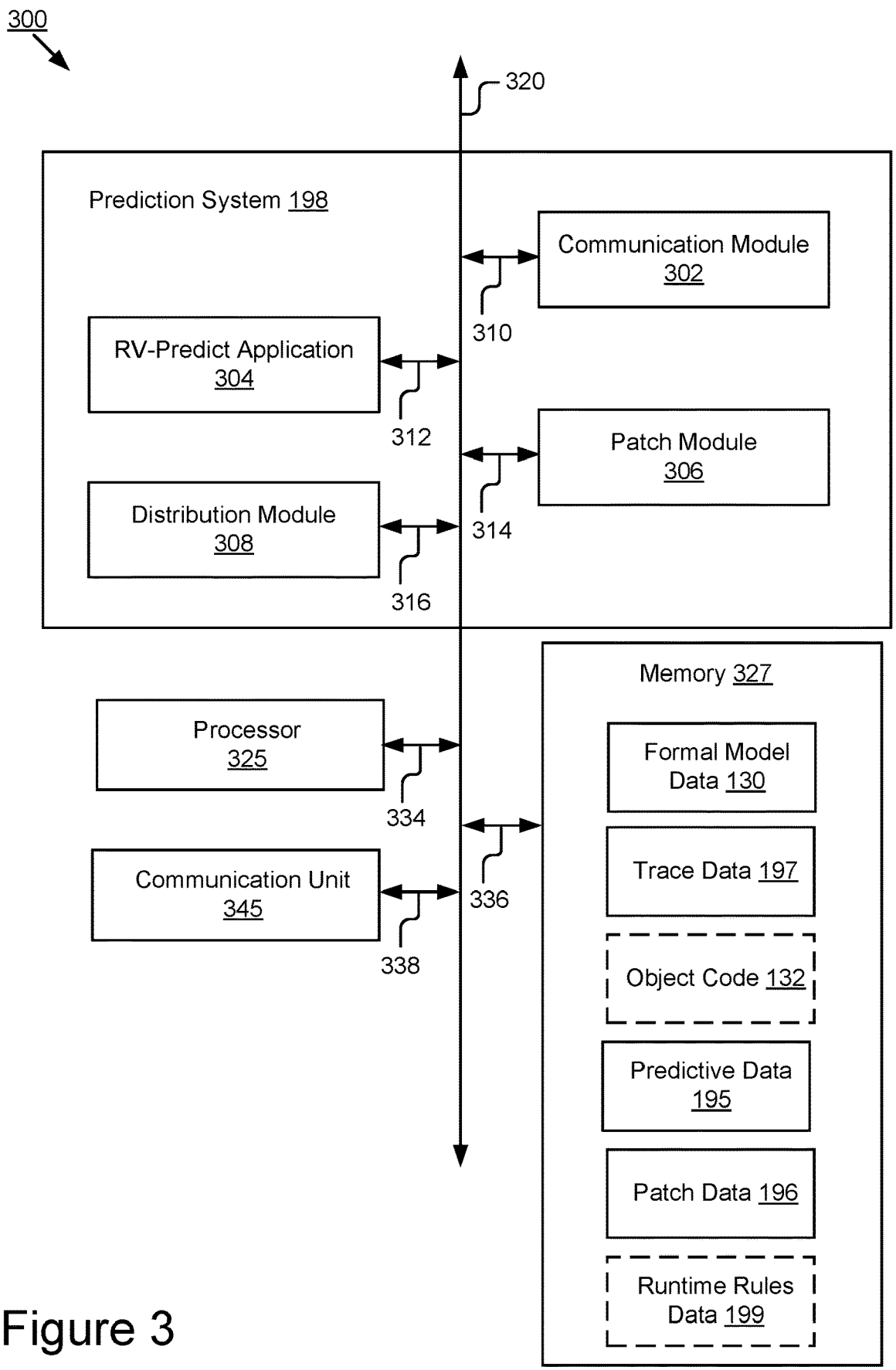
FIG. 3 is a block diagram illustrating an example system for monitoring a vehicle or a fleet of vehicles.

Referring now to FIG. 3, depicted is a block diagram illustrating an example system 300 for monitoring a vehicle 123 or a fleet of vehicles. The system 300 may be an element of the vehicle 123.

In some implementations, the system 300 may include a special-purpose computing device configured to provide some or all of the functionality described herein. The system 300 may include a special-purpose computing device configured to execute one or more steps of the method 400 described below with reference to FIG. 4. The system 300 may include a special-purpose computing device configured to execute the flow process 500 depicted in FIG. 5. The system 200 may include the monitoring server 153.

The system 300 may include the prediction system 198, a processor 325, a memory 327 and a communication unit 345. The components of the system 300 are communicatively coupled by a bus 320. In some embodiments, the components of the system 300 are local to the same hardware so that the bus 320 is not necessary for communication among the components of the system 300. In some embodiments, communication structures or methods other than the bus 320 may be implemented.

The processor 325 is communicatively coupled to the bus 320 via signal line 334. The memory 327 is communicatively coupled to the bus 320 via the signal line 336. The communication unit 345 is communicatively coupled to the bus 320 via signal line 338. In some embodiments, one or more of the elements of the system 300 may share a signal line for communication with the bus 320.

The processor 325, the communication unit 345 and the memory 327 include similar functionality as the processor 225, the communication unit 245 and the memory described above with reference to FIG. 2, respectively, and so, those descriptions will not be repeated here.

The memory 327 may include one or more of the following elements: the formal model data 130; the trace data 197; the object code 132; the predictive data 195; the patch data 196; and the runtime rules data 199. These elements of the memory 327 were described above with reference to FIG. 1, and so, those descriptions will not be repeated here.

The object code 132 is depicted with a dashed line in FIG. 3 because it is an optional feature of the system 300 according to some implementations. For example, in some implementations the patch module 306 (described below) may generate the patch data 196 without receiving the object code 132 as an input.

The runtime rules data 199 is depicted in FIG. 3 with a dashed line to indicate that it is an optional feature of the system 300.

In some implementations, the prediction system 198 includes one or more of the following: a communication module 302; an RV-Prediction application 304; a patch module 306; and a distribution module 308.

The communication module 302 is communicatively coupled to the bus 320 via a signal line 310. The RV-Prediction application 304 is communicatively coupled to the bus 320 via a signal line 312. The patch module 306 is communicatively coupled to the bus 320 via a signal line 314. The distribution module 308 is communicatively coupled to the bus 320 via a signal line 316.

The communication module 302 may include code and routines configured to handle communications between the prediction system 198 and other components of the system 300. In some implementations, the communication module 302 can include a set of instructions executable by the processor 325 to provide the functionality described below for handling communications between the prediction system 198 and other components of the system 300. In some implementations, the communication module 302 can be stored in the memory 327 of the system 300 and can be accessible and executable by the processor 325.

The communication module 302 sends and receives data, via the communication unit 345, to and from the network 105. For example, the communication module 302 receives, via the communication unit 345, the trace data 197 from the network 105.

In some implementations, the communication module 302 receives data from components of the system 300 and stores the data in the memory 327.

The RV-Predict application 304 may analyze the trace data 197 and the formal model data 130 and generate the predictive data 195 describing a predictive analysis of whether the vehicle application 191 includes an error. The error may include an error that is present in the vehicle application 191 but has not yet been detectable or observed by a human. The predictive analysis described by the predictive data 195 may predict that the error is present in the vehicle application 191 or will result in a fault or incorrect behavior of the vehicle application 191 in the future.

In some implementations, the formal model data 130 may describe the expected behavior of the vehicle application 191. The RV-Predict application 304 may analyze the trace data 197 in view of the formal model data 130.

The RV-Predict application 304 includes the RV-Predict application (or any software derived therefrom) produced and distributed by Runtime Verification Inc. of Urbana, Ill.

In some implementations, the RV-Predict application 304 may be operable so that the predictive analysis never includes a false positive. For example, each error predicted by predictive analysis is present in the vehicle application 191.

In some implementations, the RV-Predict application 304 may include a race finder and debugger software.

In some implementations, the system 300 may continuously receive additional trace data 197 and the RV-Predict application 304 may generate new predictive data 196 based on the additional trace data 197. In this way, the system 300 may continuously identify new errors and determine new patches for those errors.

In some implementations, the RV-Predict application 304 can be stored in the memory 327 of the system 300 and can be accessible and executable by the processor 325.

The patch module 306 may include code and routines configured to determine, based on the predictive data 195 and the formal model data 130, that the vehicle application includes the error. The patch module 306 may include code and routines configured to generating a patch that is operable to be installed in the vehicle application 191 to correct the error indicated by the trace data 197. The patch generated by the patch module 306 may be described by the patch data 196.

In some implementations, the patch module 306 may analyze one or more of the following to generate the patch data 196: the predictive data 195; the formal model data 130; and the object code 132. For example, the patch module 306 may identify the error based on the predictive data 195. The patch module 306 may analyze one or more of the formal model data 130 and the object code 132 to identify how the object code 132 for the vehicle application 191 should be modified to correct the error described by the predictive data 195. The patch module 306 may generate the patch data 196 describing the modification for the object code 132 that corrects the error identified by the predictive data 195.

In some implementations, the patch module 306 may include the RV-Monitor application described above.

In some implementations, the patch module 306 can be stored in the memory 327 of the system 300 and can be accessible and executable by the processor 325.

The distribution module 308 may include code and routines configured to distribute the patch data 196 to a vehicle 123 or a plurality of vehicles 123 included in a fleet of vehicles. The distribution module 308 may distribute the patch data 196 to only those vehicles 123 that include the vehicle application 191. The distribution module 308 may receive the patch data 196 from the patch module 306 and transmit the patch data 196 to the communication unit 345. The communication unit 345 may transmit the patch data 196 to the vehicle 123 (or the fleet of vehicles 123) via the network 105.

In some implementations, the distribution module 308 can be stored in the memory 327 of the system 300 and can be accessible and executable by the processor 325.

Example Methods

Figure 4:
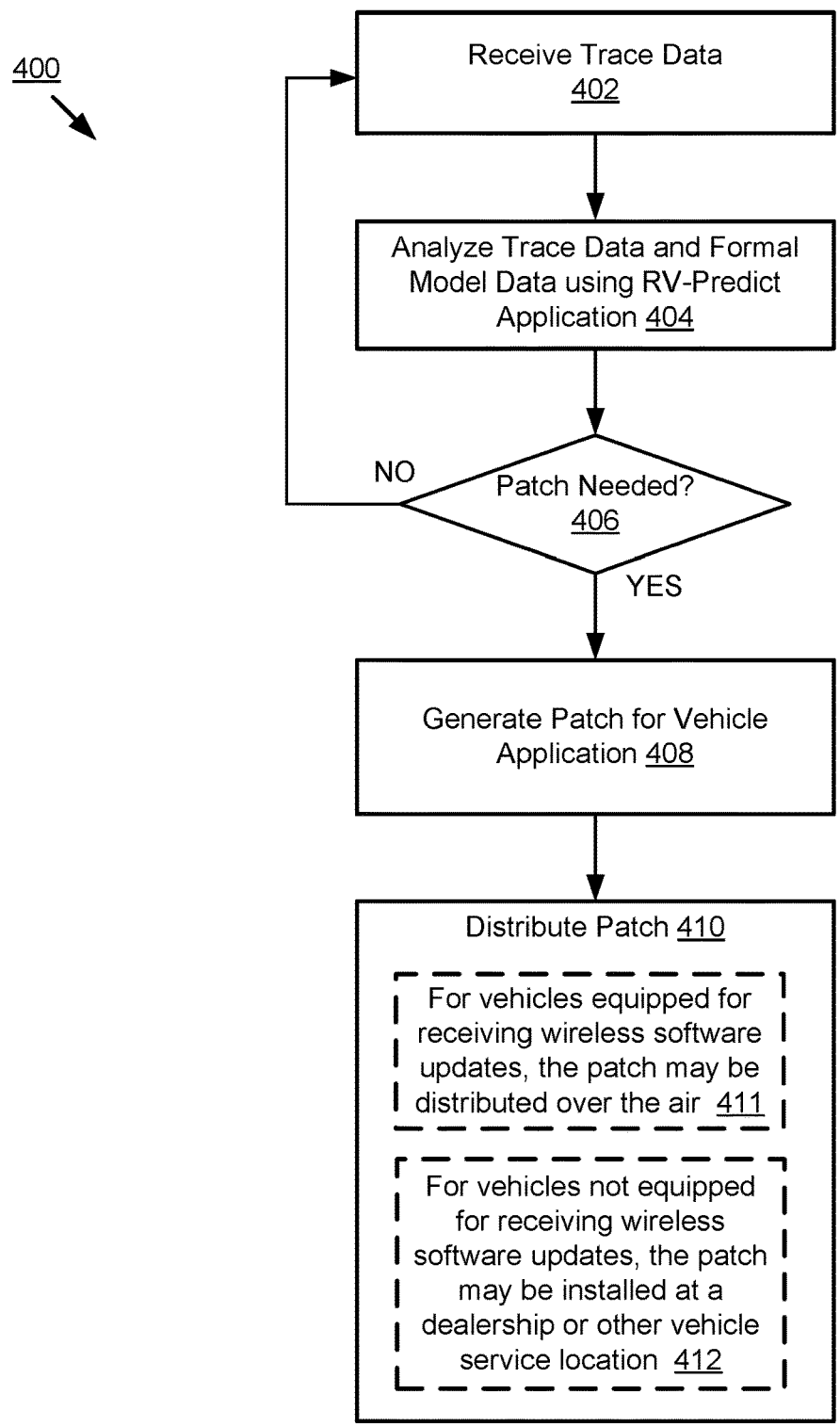
FIG. 4 is a flowchart of an example method for monitoring a vehicle application deployed among a fleet of vehicles.

FIG. 4 is a flowchart of an example method 400 for the prediction system 198 to monitor two or more copies of the vehicle application 191 deployed among a fleet of vehicles. In some implementations, each of the vehicles 123 includes a copy of the vehicle application 191.

In some implementations, one or more blocks of the method 400 may be performed by the system 300 described above with reference to FIG. 3.

At block 402 the trace data 197 is received. The trace data 197 may include a set of trace data 197 received from two or more vehicles 123 included in the fleet of vehicles.

At block 404 the trace data 197 and the formal model data 130 is analyzed using the RV-Predict application 304. The RV-Predict application 304 may output predictive data 195 based on the analysis of the trace data 197 and the formal model data 130.

At block 406 a determination may be made regarding whether a patch is needed. For example, if the RV-Predict application 304 does not identify an error present in the vehicle application 191, then a patch is not needed. If a patch is not needed, then the method 400 returns to block 402. If a patch is needed, then the method 400 proceeds to block 408.

At block 408 patch data 196 describing a patch may be generated. The patch may be configured to correct the error described by the predictive data 195.

At block 410 the patch may be distributed.

Block 411 may apply to vehicles 123 equipped for receiving wireless software updates (e.g., vehicles 123 that include a communication unit 245). Such vehicles 123 may receive a wireless software update including the patch data 196.

Block 412 may apply to vehicles 123 that are not equipped for receiving wireless software updates. Such vehicles 123 may be updated with the patch data 196 upon visiting a vehicle dealership or some other vehicle service location.

Example Flow Process

Figure 5:
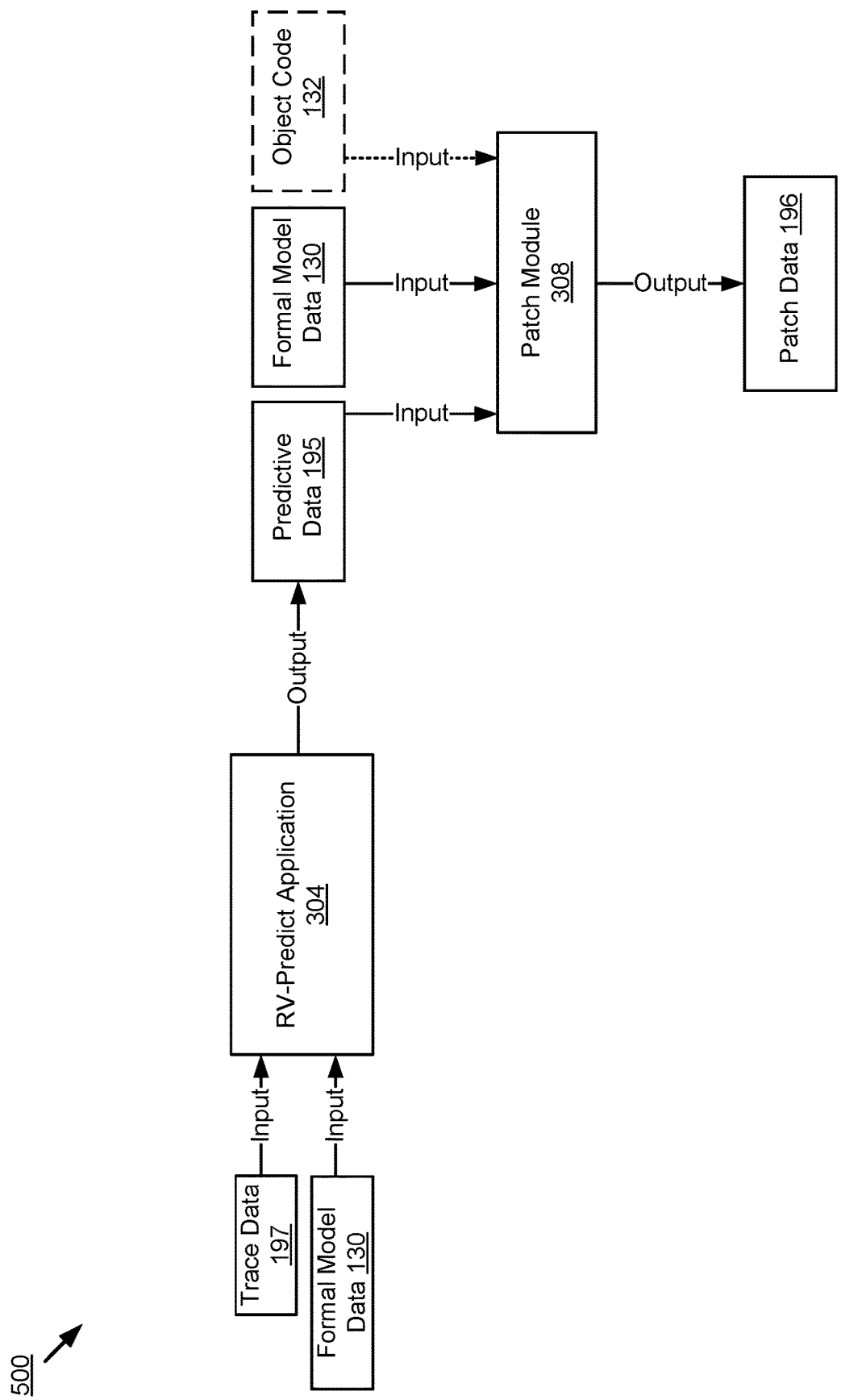
FIG. 5 is a process flow diagram of an example process for generating a patch to be distributed to a fleet of vehicles including copies of the vehicle application.

FIG. 5 is a process flow diagram of an example process 500 for generating a patch to be distributed to a fleet of vehicles including copies of the vehicle application 191.

The trace data 197 and the formal model data 130 may be inputted to the RV-Predict application 305. The RV-Predict application may output the predictive data 195.

The predictive data 195 may be inputted to the patch module 306 along with the formal model data 130.

Optionally, the object code 132 may also be inputted to the patch module 306. The object code 132 is depicted with a dashed line in FIG. 5 because it is an optional feature of the flow process 500 according to some implementations. For example, in some implementations the patch module 306 may generate the patch data 196 without receiving the object code 132 as an input. In some implementations, the patch module 306 may not receive the formal model data 130 as an input if the object code 132 is provided as an input.

The patch module 306 may output the patch data 196.

In some implementations, the patch module 306 may be an element of the RV-Predict application 305.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A method comprising:
receiving a set of trace data from a plurality of vehicles included in a fleet of vehicles, wherein the plurality of vehicles includes a copy of a vehicle application that uses object code and the set of trace data describes one or more operations that are executed responsive to an onboard vehicle computer executing the copy of the vehicle application;
inputting the set of trace data and model data into a prediction application, wherein the model data describes a formal model of the vehicle application and the formal model defines a set of desired behaviors of the vehicle application upon being executed by the onboard vehicle computer;
executing the prediction application with a processor to generate predictive data describing a predictive analysis of whether the vehicle application includes an error that is at least one of a race condition, a software bug present in the vehicle application that occurs during operation of the vehicle application, and a software concurrency error;
determining, based on the predictive data, that the vehicle application includes the error by analyzing the formal model and the object code to identify how the object code for the vehicle application is to be modified to correct the error;
generating a patch that is operable to be installed in the copy of the vehicle application to modify the object code; and
distributing the patch to one or more of the vehicles included in the fleet of vehicles.

2. The method of claim 1, wherein runtime rules describe the desired behaviors of the vehicle application after being executed by the onboard vehicle computer and the runtime rules correspond to compliance with a specification of an application programming interface (API) of the vehicle.

3. The method of claim 1, wherein the predictive analysis is proactive and occurs before the error is identifiable by operation of the fleet of vehicles.

4. The method of claim 1, wherein the set of trace data describes at least (a) one or more operations called by the vehicle application, (b) the error that occurs during execution of the vehicle application, and (c) one or more measurable parameters of the vehicle application upon being executed.

5. The method of claim 1, wherein the vehicle application is selected from a set that includes one or more of the following: a vehicle navigation application including a monitor module operable to collect the set of trace data responsive to being executed by the onboard vehicle computer; an advanced driver assistance system application including the monitor module; an infotainment system application including the monitor module; a diagnostic application including the monitor module; and an Automotive Open System Architecture ("AUTOSAR") application including the monitor module.

6. The method of claim 1, wherein the fleet of vehicles shares a common manufacturer.

7. The method of claim 1, wherein the fleet of vehicles shares a common model.

8. The method of claim 1, wherein the fleet of vehicles shares a common original equipment manufacturer ("OEM").

9. The method of claim 1, wherein the prediction application, responsive to being executed by the processor, compares the set of trace data to the set of desired behaviors of the vehicle application to provide the predictive analysis described by the predictive data.

10. The method of claim 1, wherein the method is executed by a computing device that is wirelessly coupled to the plurality of the vehicles included in the fleet of vehicles via a wireless network.

11. The method of claim 1, wherein the set of desired behaviors of the vehicle application are defined by one or more runtime rules that describe how the vehicle application should behave after being executed by the processor of the vehicle.

12. The method of claim 10, wherein distributing the patch includes wirelessly transmitting patch data describing the patch to the plurality of vehicles included in the fleet of vehicles via the wireless network.

13. The method of claim 12, further comprising the plurality of vehicles receiving the patch data via the wireless network and updating the copy of the vehicle application based on the patch data.

14. The method of claim 13, further comprising the plurality of vehicles restarting the copy of the vehicle application after updating the copy of the vehicle application based on the patch data.

15. The method of claim 1, wherein distributing the patch includes installing the patch in one or more of the vehicles included in the fleet of vehicles at a service station.

16. A non-transitory memory of a computer system, the non-transitory memory comprising computer code which, when executed by a processor, causes the processor to perform steps comprising:
receiving a set of trace data associated with a vehicle application from a plurality of vehicles included in a fleet of vehicles, wherein the plurality of vehicles each include a copy of the vehicle application that uses object code and the set of trace data describes one or more operations that are executed responsive to an onboard vehicle computer executing the copy of the vehicle application;
inputting the set of trace data and model data to a prediction application, wherein the model data describes a formal model of the vehicle application and the formal model defines a set of desired behaviors of the vehicle application upon being executed by the onboard vehicle computer;
executing the prediction application with a processor to generate predictive data describing a predictive analysis of whether the vehicle application includes an error that is at least one of a race condition, a software bug present in the vehicle application that occurs during operation of the vehicle application, and a software concurrency error;
determining, based on the predictive data, that the vehicle application includes the error by analyzing the formal model and the object code to identify how the object code for the vehicle application is to be modified to correct the error;
generating a patch that is operable to be installed in the copy of the vehicle application to modify the object code; and
distributing the patch to one or more of the vehicles included in the fleet of vehicles.

17. The non-transitory memory of the computer system of claim 16, wherein the set of desired behaviors of the vehicle application are defined by one or more runtime rules that describe how the vehicle application should behave after being executed by the processor of the vehicle.

18. A system comprising:
a processor; and
a non-transitory memory storing a prediction application, a set of trace data associated with a vehicle application that uses object code and model data describing a formal model for the vehicle application, the formal model defining a set of desired behaviors of the vehicle application upon being executed by an onboard computer;
wherein the set of trace data is received from a fleet of vehicles that include a copy of the vehicle application and the set of trace data describes one or more operations that are executed responsive to the onboard computer executing the copy of the vehicle application;
wherein the set of trace data and the model data are inputted to the prediction application;
wherein the prediction application, responsive to being executed by the processor:
generates predictive data describing a predictive analysis of whether the vehicle application includes an error that is at least one of a race condition, a software bug present in the vehicle application that occurs during operation of the vehicle application, and a software concurrency error;
determines, based on the predictive data, that the vehicle application includes the error by analyzing the formal model and the object code to identify how the object code for the vehicle application is to be modified to correct the error;
generates a patch that is operable to be installed in the copy of the vehicle application to modify the object code; and
distributes the patch to one or more of the vehicles included in the fleet of vehicles.

19. The system of claim 18, wherein the predictive analysis is proactive and occurs before the error is identifiable by operation of the fleet of vehicles.

20. The system of claim 18, wherein one or more batches of trace data are periodically received on a continuing basis and the predictive analysis is periodically repeated using the one or more batches of trace data.

* * * * *